Patented June 10, 1924.

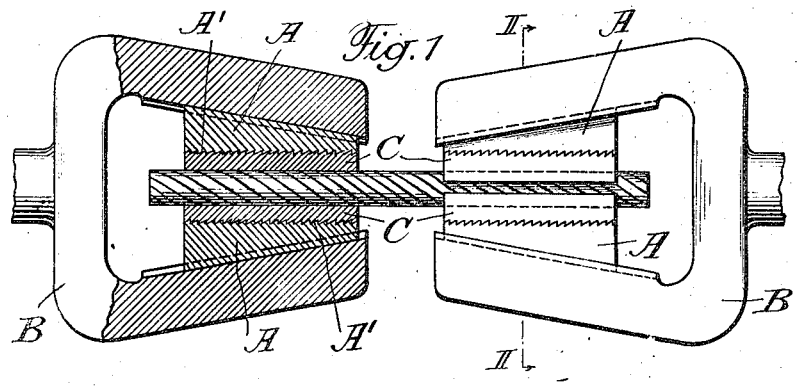
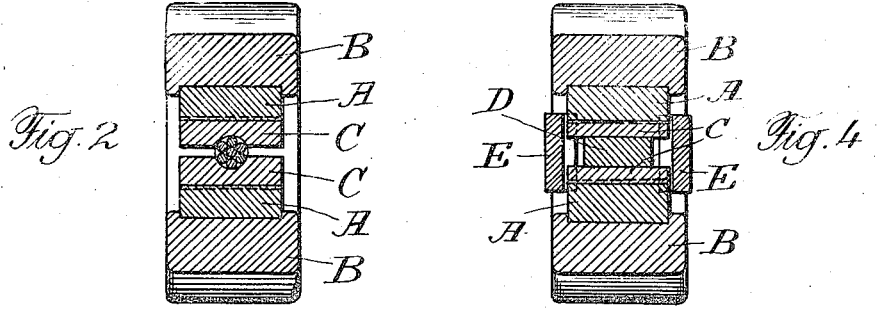
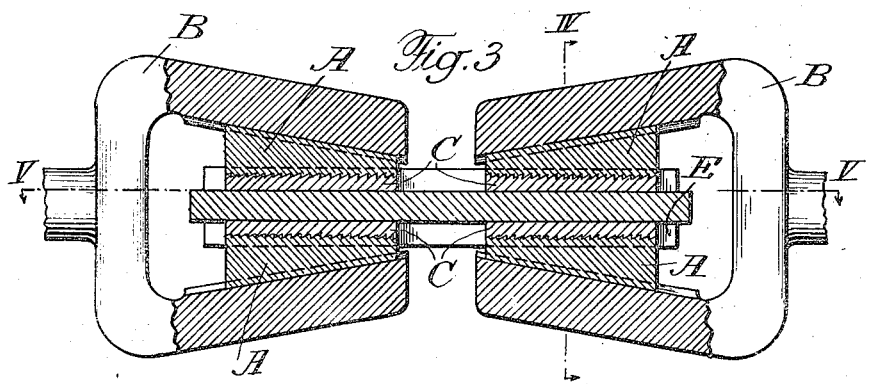
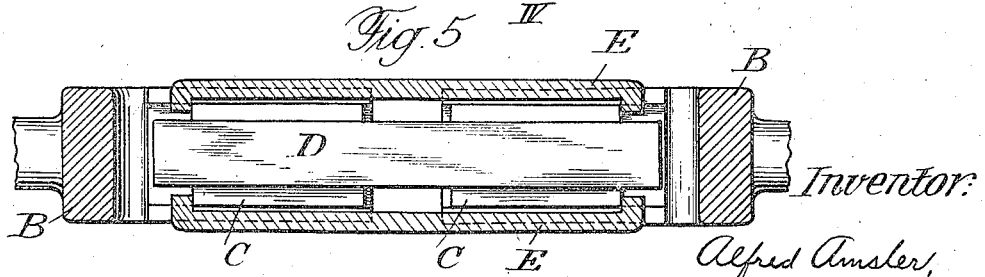

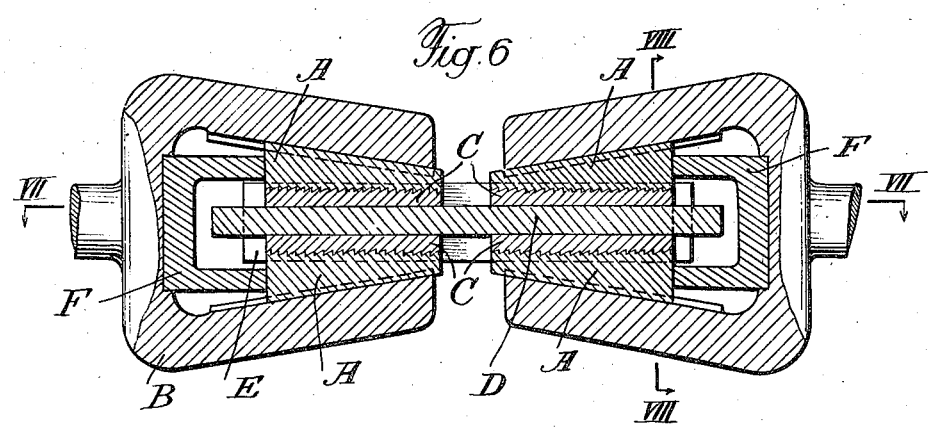
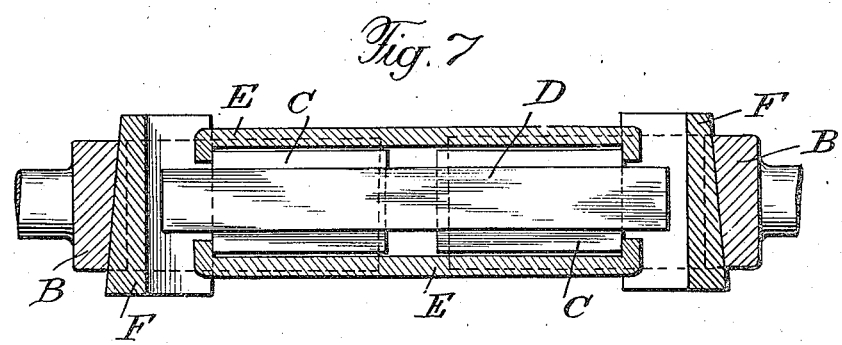
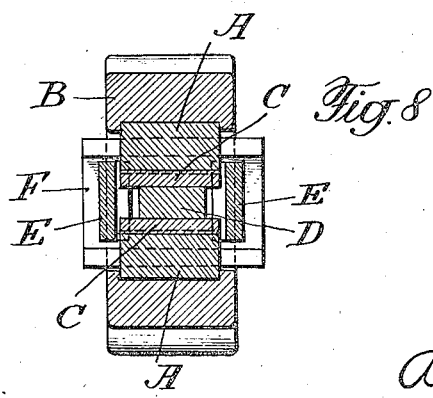

1,496,803

UNITED STATES PATENT OFFICE.

ALFRED AMSLER, OF SCHAFFHAUSEN, SWITZERLAND.

GRIPPING DEVICE FOR TESTING MACHINES AND THE LIKE.

Application filed May 31, 1921. Serial No. 474,011.

*To all whom it may concern:*

Be it known that I, ALFRED AMSLER, a citizen of the Republic of Switzerland, residing at Schaffhausen, Switzerland, have invented certain new and useful Improvements in Gripping Devices for Testing Machines and the like; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification The invention comprises improvements in gripping devices for testing machines, the object of which is in the first place to grip wire ropes or hemp ropes of circular cross-section in testing machines in such a manner, that the rope is held tight up to the breaking point without slipping or getting damaged at the ends, whereby no special preparations on the rope ends are necessary for the test. As the rope will not be damaged at the place of gripping the device will be suitable also for testing ropes which are not to be stretched to the breaking point, but which have to undergo a trial load along the whole length before they are taken into use, which is very desirable especially for hauling ropes and ship hawsers.

According to the present invention each end of the test piece is held in the gripping device in a self-adjusting chuck, the latter is tightened by means of the stress acting upon the test piece each end being embedded in a layer or lining of softer material than the test piece itself, the self-adjusting chuck holding this lining into which the surface of the test piece is thereby impressed and consequently any slipping of the test piece between the lining prevented.

It is presumed, that the friction between the lining and the test piece is at the start already so great that the latter will not slide within the former but will be gripped more tightly by the closing of the chuck. This automatic gripping certainly takes place if the test piece is hard or has a rough or uneven surface and in the absence of lubricants. But if the test piece is soft and its form is lost under moderate pressure, as for instance in the case of a hemp rope, or if the test piece is saturated with a lubricant, for instance a hauling rope of steel wires which has been in use, then the starting friction between the test piece and the linings will not be sufficient to prevent slipping between the two. In such cases, the automatic gripping chucks are so tightened by an auxiliary tightening device that the surface of the test piece will be impressed into the linings of softer material, before the test piece itself is put under testing stress. The auxiliary tightening device is thereby independent from the test piece. Furthermore a safety device is provided preventing the loosening of the gripping chucks after the auxiliary tightening device has been drawn out of action. The impressions resulting from the auxiliary device prevent the test piece from slipping in the linings from the very beginning of the test. When the test goes on, the surface of the test piece is pressed still deeper into the linings by the automatic closing of the chucks whereby the resistance against slipping increases with the load. The aforesaid also holds good for test pieces with a smooth surface. By sufficiently tightening the linings any unevennesses of the surface of the material will be gripped in the softer linings and held thereby.

If the test piece is elastic, for instance a hemp rope, or if the lining itself is elastic there will be a tendency for these elasticities to cause the self-adjusting chucks to open and the pressure between the linings and the test piece to be reduced. Therefore, in such cases it is necessary to provide means which will prevent the opening of the self gripping chucks after the auxiliary tightening device has been drawn out of action and before the testing load secures the further gripping of the chucks.

The accompanying drawings illustrate examples of construction of this invention.

Fig. 1 is a plan of one construction of the gripping device, partly in section;

Fig. 2 is a vertical section on the line II—II of Fig. 1.

Fig. 3 is a plan similar to Fig. 1 provided with a special auxiliary tightening device.

Fig. 4 is a vertical section along line IV—IV of Fig. 3.

Fig. 5 is a horizontal section along line V—V of Fig. 3.

Fig. 6 is a plan similar to Fig. 1 provided with a special auxiliary tightening device and a safety device against the loosening of the jaws.

Fig. 7 is a horizontal section along line VII—VII of Fig. 6 and

Fig. 8 is a vertical section along line VIII—VIII of Fig. 6.

Figs. 1 and 2 show the gripping of a rope of circular cross-section which is to be tested in tension. The self adjusting chuck consists of wedges A provided with teeth A' at the facing sides, the wedges A sliding in the wedge shaped mouth B thereby closing the teeth A' gripping and engaging the parts C which, for example, may be made of wood. These wooden strips form soft layers or linings for the test rope D which will be pressed in during the outward sliding of the wedges A in the mouth B.

The Figs. 3, 4 and 5 show a gripping device provided with a special auxiliary tightening device, wherein the test piece (here a flat bar) is impressed into its linings before the test piece itself is put under stress. The auxiliary tightening device consists of the two hook strips E for coupling the wedges A of the two chucks, in such a manner that they move forwards within the wedge shaped mouths B and grip the test piece while the mouths are moving one away from the other. During this operation the hook strips E—not the test piece—overcome the resistance of the wedges.

The gripping device illustrated in Figs. 6–8 is similar to the device shown in Figs. 3–5, but a safety device to prevent the loosening of the chucks is provided which consists of the wedges F which are inserted behind and across the wedges A within the mouths B, thus preventing the backward movement of A.

After the linings have been pressed on to the test pieces as aforesaid, the two hook strips E are removed and the test proper may be started.

A gripping device according to the invention is not only suitable for ropes, but also for chains, profiled rods, flat or round bars and the like which are to be tested in tension or torsion, or in tension and torsion without damaging the same at the places where they are gripped. This gripping device may also be adapted for compression tests by reversing the inclination of the sides of the chuck, whereby the ends of the test pieces cannot be supported.

I claim:

1. In a gripping device for testing machines the combination of metallic chucks arranged to adjust themselves automatically under the testing tensional load; of wooden linings held by said chucks and between which the piece to be tested becomes embedded without injuring the test piece.

2. In a gripping device for testing machines and the like, the combination of chucks adapted to adjust themselves under testing load and consisting of wedge shaped mouths and wedges sliding in said mouths, linings of softer material than the test piece itself, fitted to said wedges and impressed with the surface of the test piece ends so as to prevent the latter from slipping in the linings, a special auxiliary tightening device consisting of hook strips operatively connected to said wedges for impressing the surface of the test piece ends into the linings before the test piece itself is put under testing stress, and means inserted between the thicker ends of said wedges and the wedge shaped mouth for preventing the liners from becoming loose when said hook strips have been taken off and before the testing load provides for a further grip of the self-adjusting chucks.

3. In a gripping device for testing machines, the combination of a pair of chucks self-adjusting under tension load and comprising wedge-shaped mouths, gripping wedges slidable in said mouths, linings for said wedges, and transverse wedges between the thicker ends of the gripping wedges and said mouths to follow up the movement of said gripping wedges due to testing conditions.

In testimony that I claim the foregoing as my invention, I have signed my name.

ALFRED AMSLER.